United States Patent
Lee

Patent Number: 6,002,380
Date of Patent: Dec. 14, 1999

[54] CIRCUIT FOR COMPENSATING FOR VERTICAL DISTORTION OF IMAGE BY MODES IN DISPLAY

[75] Inventor: Seung-Taek Lee, Suwon, Rep. of Korea

[73] Assignee: SamSung Electronics Co., Ltd., Suwon, Rep. of Korea

[21] Appl. No.: 08/910,323

[22] Filed: Aug. 13, 1997

[30] Foreign Application Priority Data

Aug. 13, 1996 [KR] Rep. of Korea ............ 96-33586
Aug. 13, 1996 [KR] Rep. of Korea ............ 96-33591

[51] Int. Cl.$^6$ .................................................. G09G 1/06
[52] U.S. Cl. .................................... 345/13; 315/371
[58] Field of Search ............................ 345/13, 14–19; 315/364, 370, 371, 388, 408

[56] References Cited

U.S. PATENT DOCUMENTS

| | | | |
|---|---|---|---|
| 3,968,402 | 7/1976 | Sahara et al. | 315/370 |
| 4,063,134 | 12/1977 | Iida | 315/371 |
| 4,206,388 | 6/1980 | Ishigaki et al. | 315/371 |
| 4,422,020 | 12/1983 | Lehnert et al. | 315/371 |
| 5,010,280 | 4/1991 | Ogino et al. | 315/388 |
| 5,021,719 | 7/1991 | Arai et al. | 315/364 |
| 5,113,122 | 5/1992 | Bando et al. | 315/371 |
| 5,663,615 | 9/1997 | Ogino | 315/371 |
| 5,712,532 | 1/1998 | Ogino et al. | 315/1 |
| 5,808,426 | 9/1998 | Lee | 315/408 |

*Primary Examiner*—Matthew Luu
*Assistant Examiner*—Jeff Piziali
*Attorney, Agent, or Firm*—Robert E. Bushnell, Esq.

[57] ABSTRACT

A circuit for compensating for a vertical distortion of images by modes includes: a compensation position regulator for regulating a pulse width of a horizontal output signal by varying an integration value of an output pulse width of a horizontal output circuit, for adjusting an output position of the horizontal output signal; a compensation size regulator for selectively amplifying the horizontal output signal voltage whose output position has been regulated by the compensation position regulator, for adjusting the voltage amplitude of the horizontal output signal; and a modulation circuit including a primary circuit for receiving the horizontal output signal whose output position and size are regulated by the compensation position regulator and the compensation size regulator, and a secondary circuit for receiving a vertical output signal having a period variable by modes through one terminal thereof, the modulation circuit modulating the vertical output signal selected by modes with the horizontal output signal to a vertical deflection coil connected to another terminal of the secondary circuit and outputting he modulated vertical output signal.

16 Claims, 7 Drawing Sheets

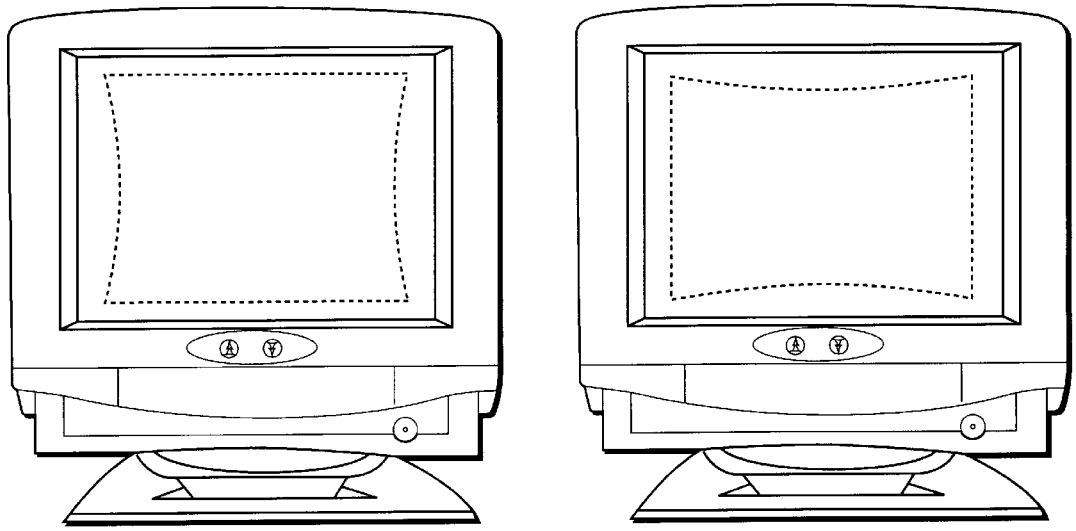
FIG. 2A
RELATED ART
FIG. 2B
RELATED ART
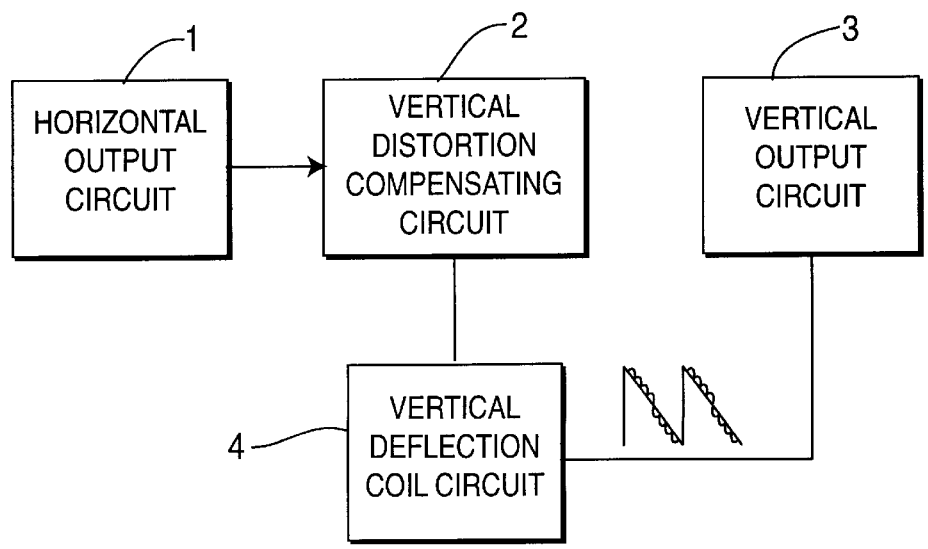
FIG. 3

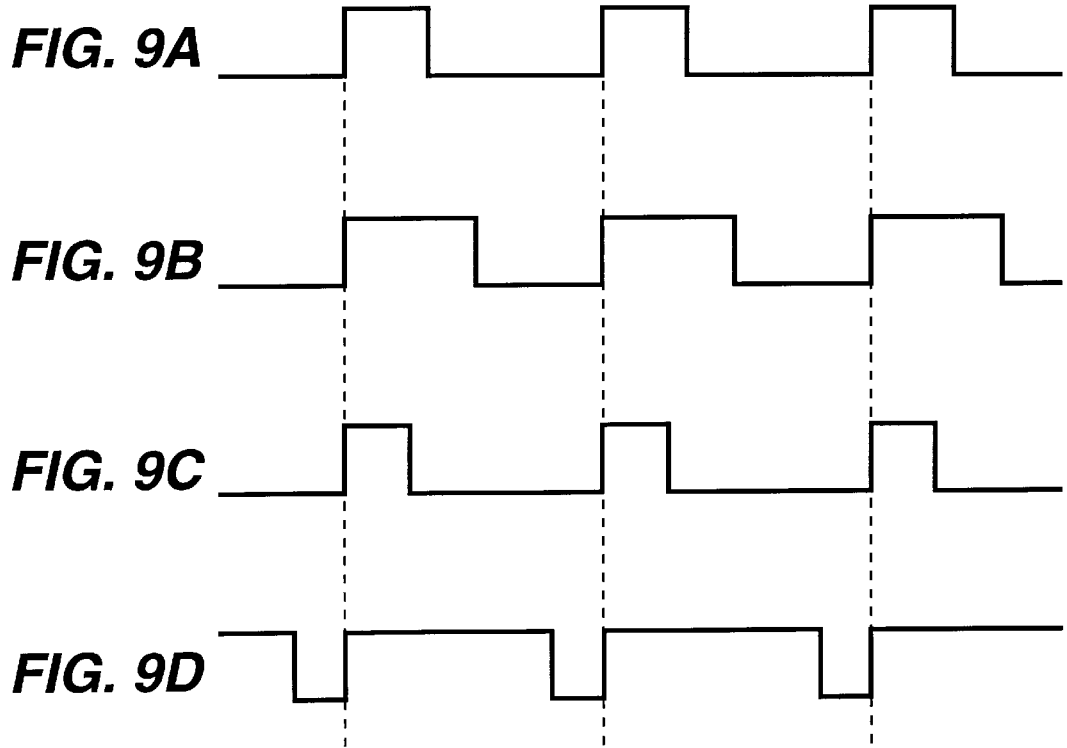
*FIG. 9A*
*FIG. 9B*
*FIG. 9C*
*FIG. 9D*
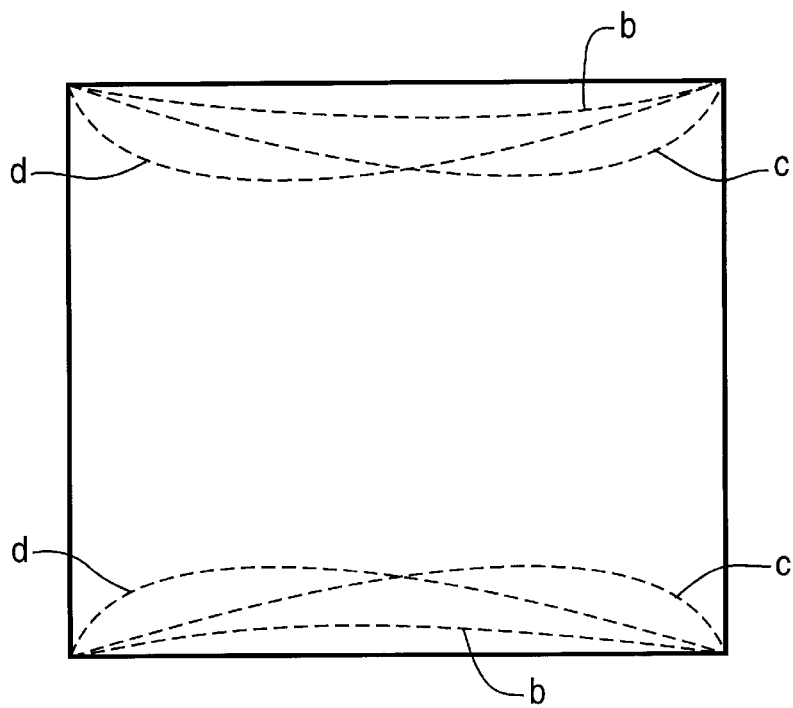
*FIG. 10*

CIRCUIT FOR COMPENSATING FOR VERTICAL DISTORTION OF IMAGE BY MODES IN DISPLAY

CLAIM OF PRIORITY

This application makes reference to, incorporates the same herein, and claims all benefits accruing under 35 U.S.C. §119 from two applications, both entitled CIRCUIT FOR COMPENSATING VERTICAL DISTORTION OF IMAGE BY MODES IN DISPLAY, and both earlier filed in the Korean Industrial Property Office on the 13$^{th}$ day of Aug. 1996 and there duly assigned Serial Nos. 33586/1996 and 33591/1996, copies of which applications are annexed hereto.

BACKGROUND OF THE INVENTION

1. Field of the Invention

The present invention relates to a circuit for compensating for a vertical distortion of images by modes in a display and, more particularly, to a circuit for compensating for a vertical distortion of images by modes, by varying the pulse width of a horizontal output signal to regulate the compensation position, selectively amplifying the voltage of the position-compensated signal to adjust the compensation size, modulating a vertical output signal varied by modes with the compensated horizontal output signal by using an E-I transformer, and applying the modulated vertical output signal to a vertical deflection coil.

2. Discussion of Related Art

In a monitor used as a display in a computer system, a computer includes a central processing unit (CPU) for processing a received keyboard signal and a video card for processing the output signal of the computer into picture signals R, G and B and for generating horizontal and vertical synchronizing signals H-Sync and V-Sync for processing.

The picture signals and the horizontal and vertical synchronizing signals are transferred to a monitor through a picture signal cable. A microcomputer receives the horizontal and vertical synchronizing signals through the picture signal cable to generate a control signal such as an image adjusting signal and a reference oscillation signal. A control button section generates screen control signals to operate the microcomputer. When a user selects an input signal, the control button section transmits the input signal to the microcomputer. A horizontal/vertical synchronizing output circuit receives the image adjusting signal and the reference oscillation signal generated by the microcomputer to synchronize a raster. A video circuit amplifies the picture signals transferred from the video card. A power supply circuit provides power to the microcomputer, the horizontal/vertical synchronizing output circuit and the video circuit.

The display CRT, connected to the video circuit, has electron guns for projecting the electron beams on a screen. As the electron beams are projected horizontally on the screen, an image is formed according to the concentration of the beams. Since the electric field formed by a deflection yoke deflects the electron beams, external factors affecting the electric field can change the deflection angle of the electron beams. The image displayed on the screen may be distorted by internal or external factors. The image may be formed horizontally or vertically in an unsymmetrical way when the electron beams are abnormally projected by the resistance of the image receiver itself as well as an image rotation effect caused by an external magnetic field. An unbalanced image can also be formed by an excessive current applied to the deflection yoke.

One distortion, called a side pin cushion, can be solved by varying the horizontal deflection output voltage and controlling the horizontal width with a pin cushion compensator. The vertical circuit transfers a sawtooth voltage to an integrating circuit and converts it into a parabolic voltage. The pin cushion compensator modulates the parabolic voltage supplied to the horizontal output circuit to adjust the compensation size and position.

The image can be vertically distorted by the generation of the parabolic waveform from the sawtooth oscillation output signal according to the charging and discharging time constant of an RC combination or by the non-linear characteristics of a transistor. Though applying a non-linear current may compensate for the vertical distortion of images, it is unfortunately not applicable to the earlier systems.

SUMMARY OF THE INVENTION

Accordingly, the present invention is directed to a circuit for compensating for a vertical distortion of images in a display that substantially obviates one or more of the problems due to limitations and disadvantages of the related art.

An object of the present invention is to provide a circuit for compensating for a vertical distortion of images by modes, by varying the pulse width of a horizontal output signal to regulate the compensation position, selectively amplifying the voltage of the position-compensated signal to adjust the compensation size, modulating a vertical output signal varied by modes with the compensated horizontal output signal by using an E-I transformer, and applying the modulated vertical output signal to a vertical deflection coil.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a circuit for compensating for a vertical distortion of images by modes comprises: a compensation position regulator for regulating the pulse width of a horizontal output signal by varying the integration value of the output pulse of a horizontal output circuit, to adjust the output position of the horizontal output signal; a compensation size regulator for selectively amplifying the voltage of the horizontal output signal whose output position is regulated by the compensation position regulator, to adjust the output size of the horizontal output signal; and a modulation circuit comprising a primary circuit for receiving the horizontal output signal whose output position and size are regulated by the compensation position regulator and the compensation size regulator, and a secondary circuit for receiving a vertical output signal having a period variable by modes through one terminal thereof, the modulation circuit modulating the vertical output signal selected by modes with the horizontal output signal according to the of input frequency value, an feeds the modulated vertical output signal to a vertical deflection coil connected to another terminal of the secondary circuit.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 2A and 2B are exemplary views of an abnormal image on a display;

FIG. 3 is a partial block diagram of a display in accordance with the present invention;

Figure 4:
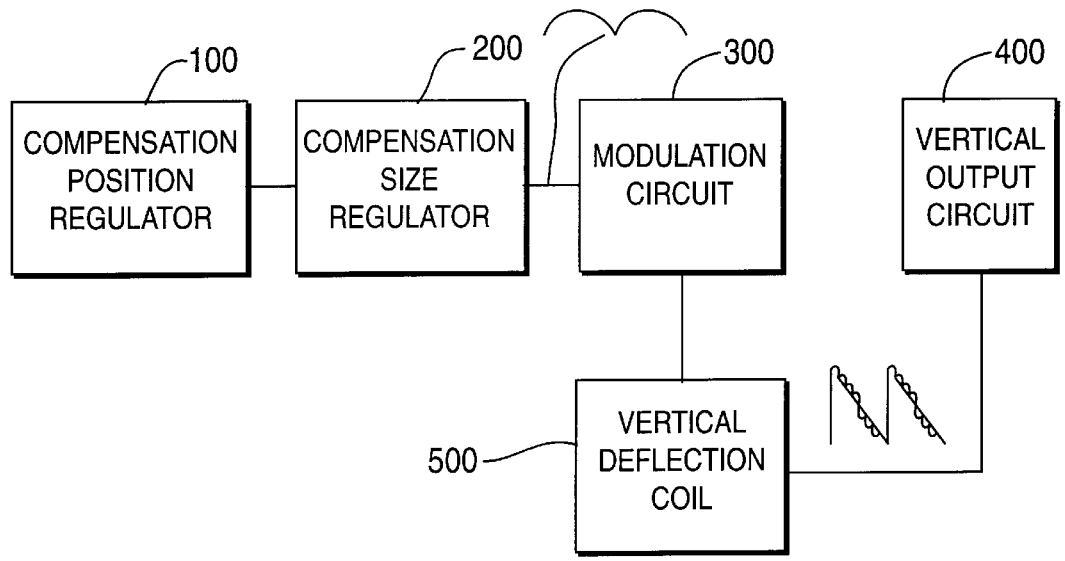
FIG. 4 is a block diagram of a circuit for compensating for a vertical distortion of images in accordance with the present invention.
Figure 5:
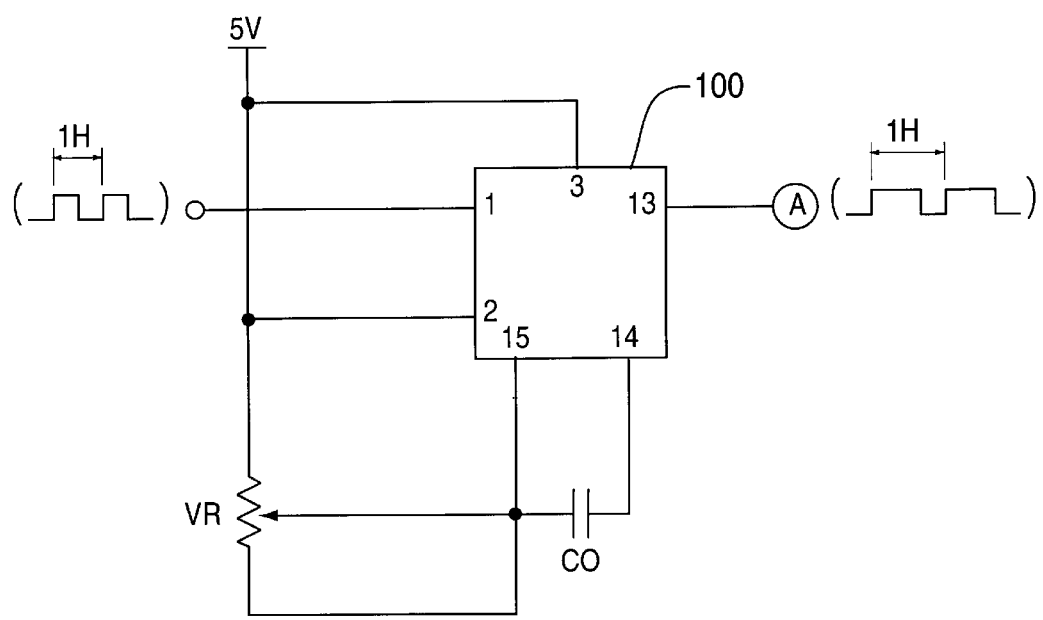
FIG. 5 is a circuit diagram of the compensation position regulator shown in FIG. 4.
Figure 6:
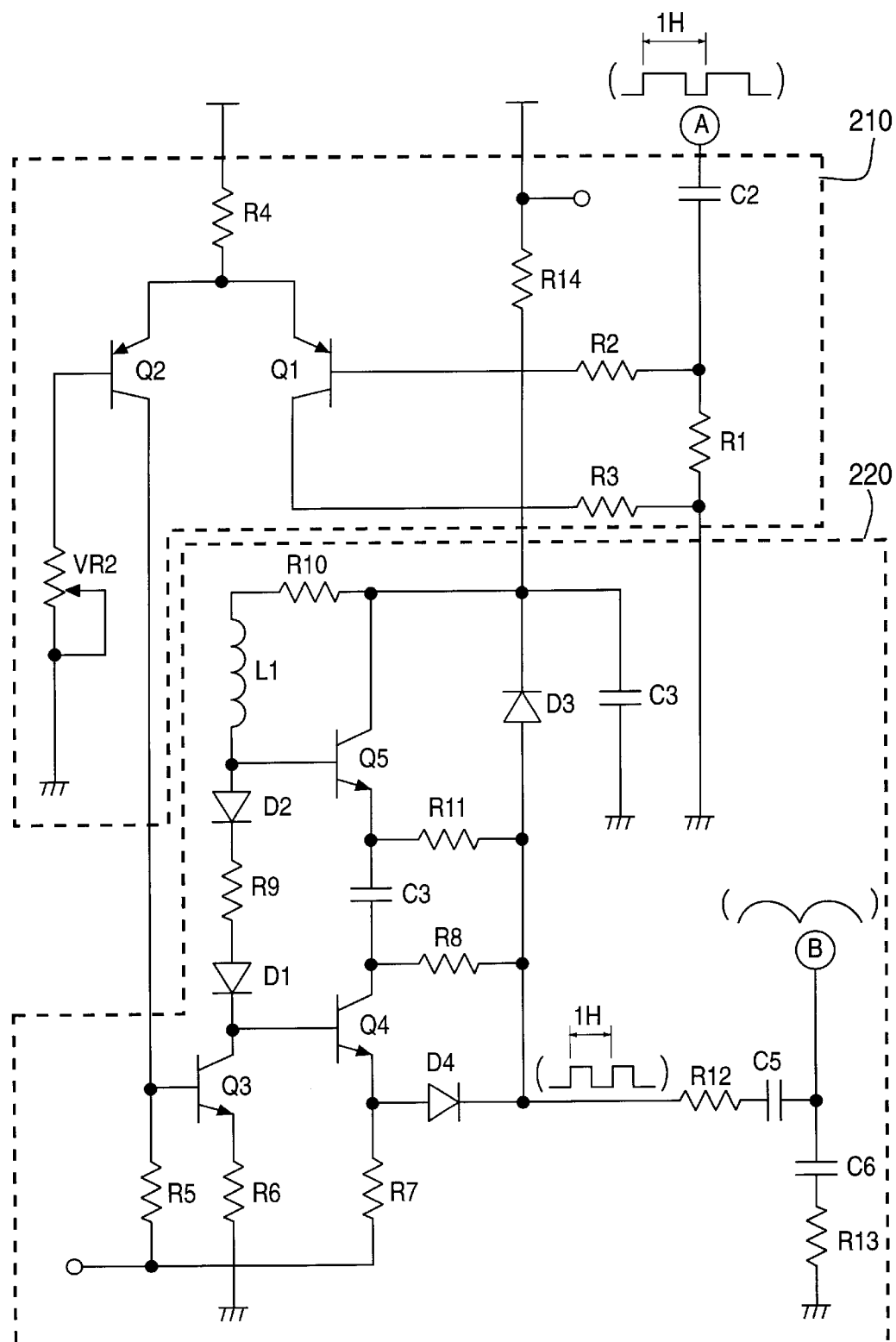
FIG. 6 is a circuit diagram of the compensation size regulator shown in FIG. 4.
Figure 11A:
Figure 11B:
Figure 11C:
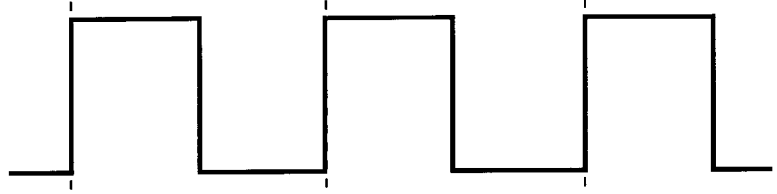
Figure 11D:
Figure 12:
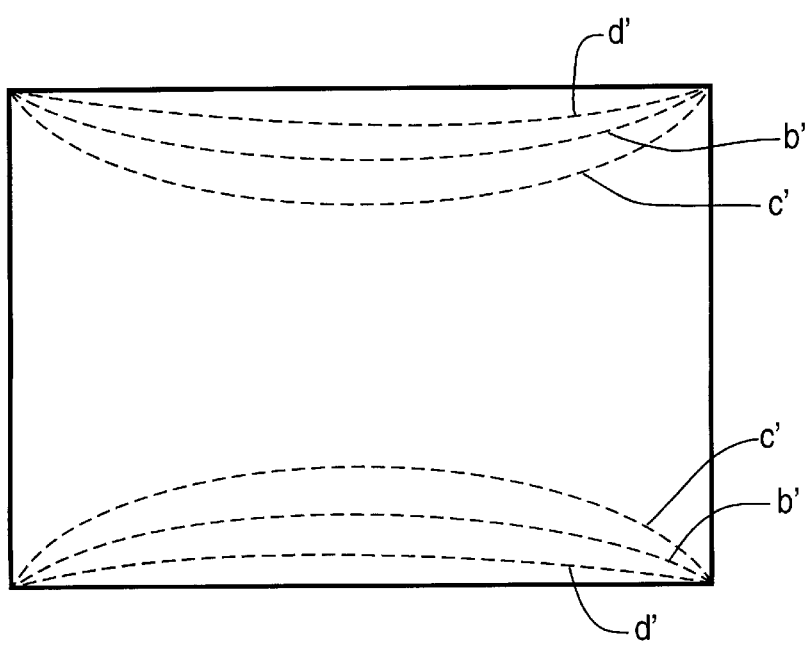

FIGS. 9A–9D together form a waveform diagram of the variable output signal of the compensation position regulator shown in FIG. 4;

FIG. 10 is an exemplary view of an image distorted depending on the variable output signal of the compensation position regulator shown in FIG. 5;

FIGS. 11A–11D together form a waveform diagram of the variable output signal of the compensation size regulator shown in FIG. 6; and FIG. 12 is an exemplary view of an image distorted depending on the variable output signal of the compensation size regulator shown in FIG. 6.

DETAILED DESCRIPTION OF THE PREFERRED EMBODIMENTS

Reference will now be made in detail to the preferred embodiments of the present invention, examples of which are illustrated in the accompanying drawings.

Figure 1:
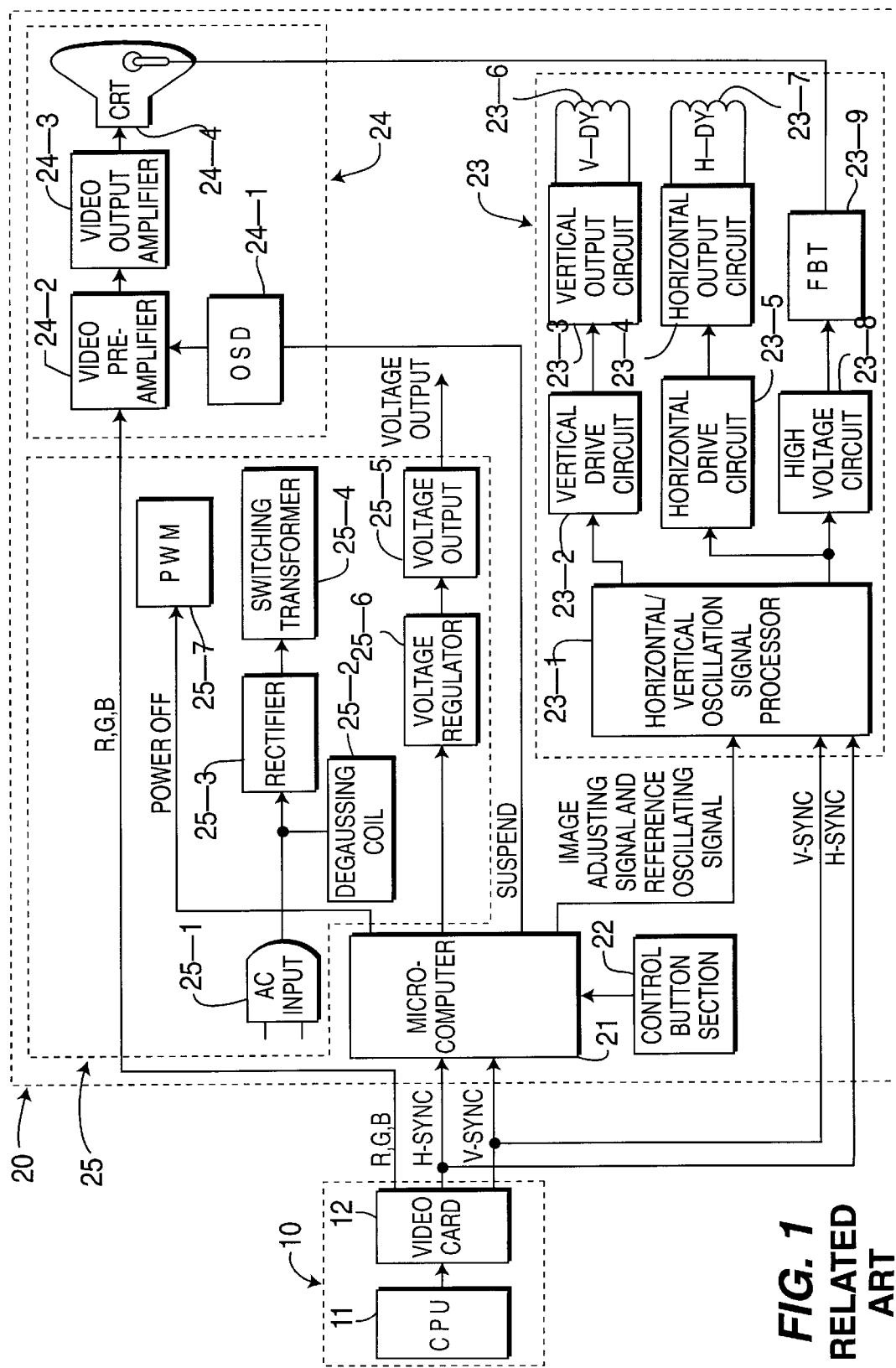
FIG. 1 is a block diagram of a display.

FIG. 1 is a schematic of the internal construction of a monitor used as a display in a computer system. Referring to FIG. 1, a computer 10 comprises a central processing unit (CPU) 11 for processing a received keyboard signal, and a video card 12 for processing the output signal of the computer 11 into picture signals R, G and B and for generating horizontal and vertical synchronizing signals H-Sync and V-Sync for the processing.

The picture signals R, G and B, and the horizontal and vertical synchronizing signals H-Sync and V-Sync are transferred to a monitor through a picture signal cable (not shown). A microcomputer 21 receives the horizontal and vertical synchronizing signals H-Sync and V-Sync through the picture signal cable to generate a control signal such as image adjusting signal and reference oscillation signal. A control button section 22 generates screen control signals to operate the microcomputer 21. When a user selects an input signal, the control button section 22 transmits the input signal to the microcomputer 21. A horizontal/vertical synchronizing output circuit 23 receives the image adjusting signal and the reference oscillation signal generated by the microcomputer 21 to synchronize a raster. A video circuit 24 amplifies the picture signals transferred from the video card 12. A power supply circuit 25 provides power to the microcomputer 21, the horizontal/vertical synchronizing output circuit 23, and the video circuit 24.

The following is a detailed description of the internal blocks of the display constructed as noted above. With the horizontal and vertical synchronizing signals H-Sync and V-Sync transferred from the video card 12, the microcomputer 21 generates an image adjusting signal to adjust the image formed on a screen according to the screen control signal of the control button section 22. Receiving the image adjusting signal and the reference oscillation signal from the microcomputer 21, a horizontal/vertical oscillation signal processor 23-1 transfers vertical pulses to a vertical driving circuit 23-2 according to the horizontal and vertical synchronizing signals H-Sync and V-Sync, so as to regulate the speed of switching operation of a sawtooth wave generator.

A single stage vertical amplifier is generally used for the vertical driving circuit 23-2 that receives the vertical pulses. An emitter follower vertical driving circuit which is also widely used comprises a transistor having a base for receiving an input signal and an emitter for generating an output signal. Thus, the vertical driving circuit 23-2 is operated for the improvement of linearity rather than for gain.

Receiving a current signal from the vertical driving circuit 23-2, a vertical output circuit 23-3 produces a sawtooth current signal corresponding to the vertical synchronizing signal which flows through a vertical deflection yoke V-DY 23-6, so as to determine a vertical scan period. The horizontal/vertical oscillation signal processor 23-1 generates a horizontal oscillation signal and transfer it to a horizontal driving circuit 23-5. Then, the horizontal driving circuit 23-5 supplies sufficient current to drive a horizontal output circuit 23-4. The horizontal output circuit 23-4 receives the current from the horizontal driving circuit 23-5 and generates a sawtooth current which flows through a horizontal deflection yoke H-DY 23-7, so as to determine a horizontal scan period. In addition, a flyback transformer (hereinafter, referred to as a "FBT") 23-9 is used to supply a stable DC current to the anode of a CRT 24-4. The FBT generates a high voltage with a low current pulse by using higher harmonics produced by a leakage inductance and the distribution capacity of a high voltage circuit 23-8. The anode receives the high voltage to adjust the luminance of the picture signals R, G and B amplified by the video circuit 24.

A video pre-amplifier 24-2 receives the OSD (on screen display) gain signal from an OSD section 24-1 and the picture signals R, G and B from the video card 12. The video pre-amplifier 24-2 amplifies the low voltage picture signals R, G and B with a low voltage to maintain a constant voltage level.

For example, a signal can be amplified from 1 $V_{pp}$ or less into 4~6 $V_{pp}$. A video output amplifier 24-3 amplifies the signal of 4~6 V into that of 40~60 V to apply energy to each picture element. The picture signals amplified by the video output amplifier 24-3 are transferred to the cathode of a CRT 24-4 to display an image on a screen. After the video pre-amplifier 24-2 amplifies an OSD into a predetermined voltage level, the OSD is finally amplified by the video output amplifier 24-3 to display the OSD data on the screen of the CRT 24-4.

The power supply circuit 25, which supplies a driving voltage to the monitor, receives alternating current (hereinafter, referred to as "AC") voltage through an AC input terminal 25-1. AC voltage is applied to a degaussing coil 25-2 through the AC input terminal 25-1. The degaussing coil 25-2 disperses the magnetic field formed on the shadow mask in the monitor when it is supplied with an AC current for about 2 to 8 seconds. With this, the purity of colors reduced by the earth's magnetic field or other external factors can be restored. DC current rectified by a rectifier 25-3 is supplied to a switching transformer 25-4 for supplying driving voltages to the monitor through a voltage output terminal 25-5.

Without a vertical synchronizing signal V-Sync applied, the microcomputer 21 generates a suspend mode signal to a voltage regulator 25-6 so as to interrupt a deflecting voltage.

The global waveform pulse of a pulse width modulator (hereinafter, referred to as a "PWM") 25-7 drives the switching devices. With the width of the global waveform pulse changing, a conduction time is increased or decreased to stabilize the output voltage. The microcomputer 21 executes a DPMS mode according to the presence of the horizontal and vertical synchronizing signals to curtail the power consumption in the monitor 20.

The display has electron guns for projecting the electron beams on a screen. As the electron beams are projected horizontally on the screen, an image is formed according to the concentration of the beams. Since the electric field formed by the deflection yoke deflects the electron beams, external factors affecting the electric field can change the deflection angle of the electron beams.

The image displayed on the screen may be distorted by internal or external factors, as shown in FIGS. 2A and 2B. The image is formed horizontally or vertically in an unsymmetrical way when the electron beams are abnormally projected by the resistance of the image-receiver itself, as well as an image rotation effect caused by an external magnetic field. An unbalanced image can also be formed by an excessive current applied to the deflection yoke.

The phenomenon shown in FIG. 2A is called a side pin cushion. This problem can be solved by varying the horizontal deflection output voltage and controlling the horizontal width with a pin cushion compensator (not shown). The vertical circuit transfers a sawtooth voltage to an integrating circuit, converting it into a parabolic voltage. The pin cushion compensator modulates the parabolic voltage supplied to the horizontal output circuit to adjust the compensation size and position.

The image can be vertically distorted as shown in FIG. 2B by the generation of the parabolic waveform from the sawtooth oscillation output signal according to the RC charging and discharging time constant, or by the non-linear characteristics of a transistor. Though applying a non-linear current may compensate for the vertical distortion of images, it is unfortunately not applicable to earlier systems. The present invention amplifies the synchronizing signal of a horizontal deflector and uses it to modulate a vertical circuit.

FIG. 3 is a block diagram of the deflection circuit of a display in accordance with the present invention. As shown in FIG. 3, a vertical distortion compensating circuit 2 adjusts the compensation position and size of a vertical image by using the output signal of a horizontal output circuit 1. A compensation signal modulates the output signal of a vertical output circuit 3 and the modulated signal is transferred to a vertical deflection coil 4.

FIG. 4 is a block diagram of the vertical distortion compensating circuit shown in FIG. 3. Referring to FIG. 4, the compensating circuit comprises: a compensation position regulator 100 for integrating the horizontal signal of the horizontal output circuit to vary its pulse width; a compensation size regulator 200 for controlling the voltage of the horizontal signal whose compensation position has been adjusted; and a modulation circuit 300 which uses the horizontal signal regulated by the compensation position regulator 100 and the compensation size regulator 200 to modulate the vertical output signal of a vertical output circuit 400 whose period is varied by modes, and transferring its output signal to a vertical deflection coil 500.

FIG. 5 is a circuit diagram of the compensation position regulator 100 shown in FIG. 4. The compensation position regulator 100 comprises a multivibrator M-V for determining the output pulse width of the horizontal pulse according to the RC time constant having a variable resistance VR and a capacitor C0, to generate a desired output pulse width.

FIG. 6 is a circuit diagram of the compensation size regulator 200 shown in FIG. 4. The compensation size regulator 200 comprises a buffer 210 for controlling the gain of the output signal of the multivibrator M-V, and an amplifier 220 for amplifying the input signal whose gain has been regulated.

The buffer 210 comprises a plurality of resistances R1 to R4, and transistors Q1 and Q2. The resistance R1 detects the output signal of the compensation position regulator 100 and the resistances R2 and R3 are used as a voltage-divider. The base of a transistor Q1 is connected to the resistance R2 and the collector of the transistor Q1 is connected to the resistance R3. The emitter of the transistor Q1 is connected to that of a transistor Q2 at a connection point having a load resistance R4. The base of the transistor Q2 is connected to a variable resistance VR2 for regulating the current that flows to the collector. The amplifier 220 used to amplify the input signal whose gain is regulated comprises a plurality of resistances R5 to R13, amplifying transistors Q3, Q4 and Q5, capacitors C3 to C6, and diodes D1 to D4. A transistor Q3 has a base connected to the resistance R5, an emitter to the resistance R6, and a collector to the diode D1, resistance R9 and diode D2 in series. A transistor Q4 comprises a base connected to the collector of the transistor Q3, a collector connected to the resistance R7 and diode D4, and an emitter connected to the capacitor C3 and resistance R8.

A transistor Q5 has a base connected to a coil L1 and the diode D2 is connected to the collector of the transistor Q3. The emitter of the transistor Q5 is connected to the capacitor C3 and resistance R11, and the collector of the transistor Q5 is connected to the diode D3, resistances R10 and R14. The diode D4 connected to the collector of the transistor Q4 is connected to the resistance R12, capacitors C5 and C6, and resistance R13.

Figure 7:
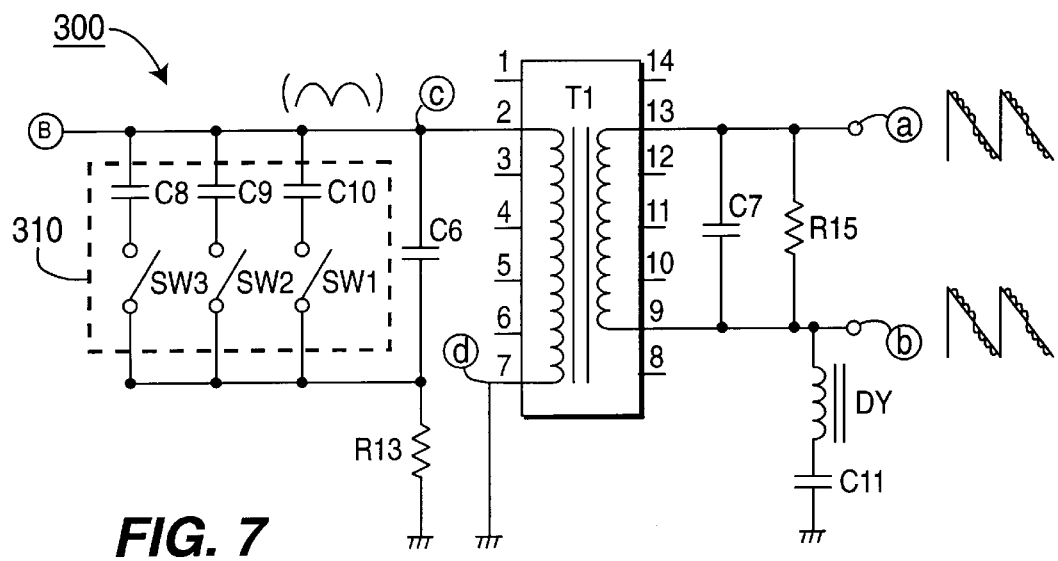
FIG. 7 is a circuit diagram of the modulation circuit section in accordance with a preferred embodiment of the present invention.

FIG. 7 is a circuit diagram of the modulation circuit section 300 shown in FIG. 4 as constructed in accordance with a preferred embodiment of the present invention. The modulation circuit section 300 comprises a switching section 310 that provides a vertical period which is variable depending on the E-I transformer T1 and the mode of the vertical output signal. The switching section 310 regulates the RC resonance value so as to select the vertical period according to the chosen mode. It is designed to be capable of selecting the capacitors C8, C9 and C10 depending on the on/off states of a plurality of switches $SW_1$ to $SW_N$.

Figure 8:
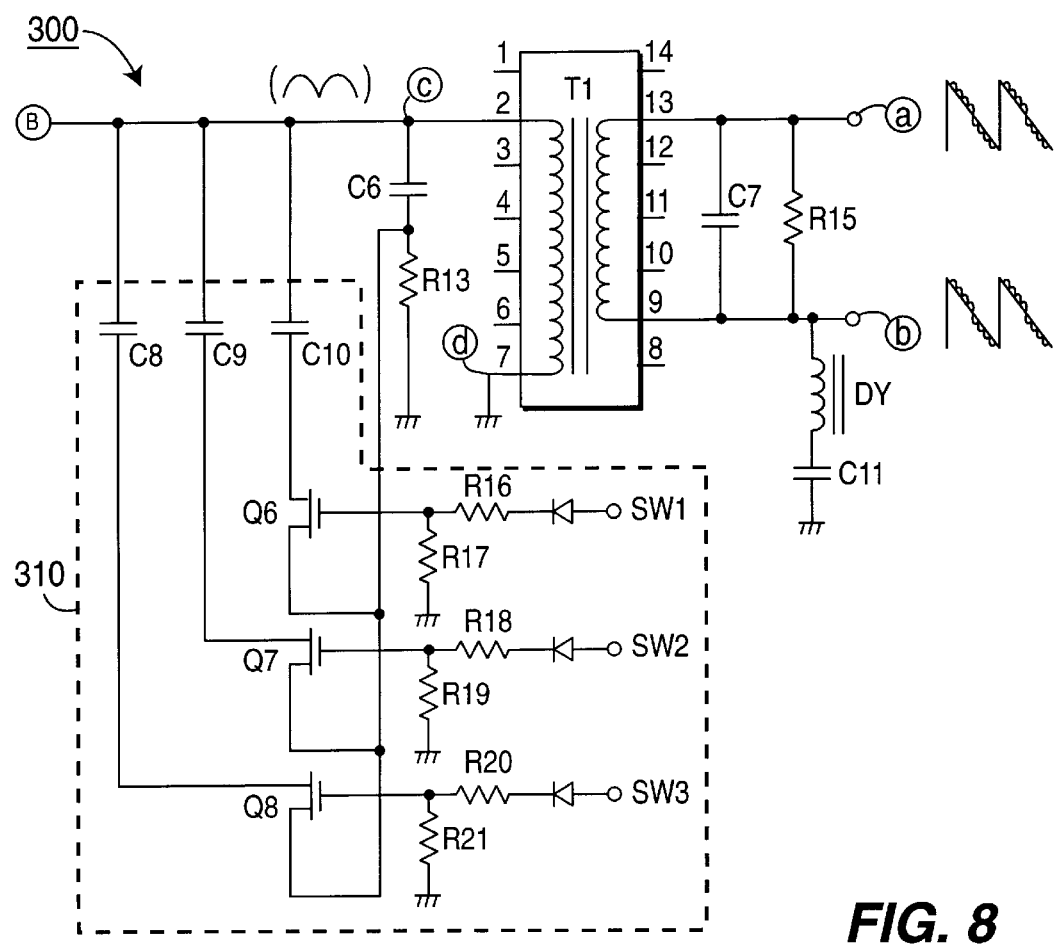
FIG. 8 is a circuit diagram of the modulation circuit section in accordance with another preferred embodiment of the present invention.

FIG. 8 is a circuit diagram of the modulation circuit section 300 in accordance with another preferred embodiment of the present invention. The modulation circuit section 300 is connected to the capacitors C8, C9 and C10 according to the on/off states of a plurality of oftransistors FET1, FET2 and FET3.

The modulation circuit section of this embodiment is the same as that of the first embodiment but the differences are in the switching devices. The "c'" terminal of the E-I transformer T1 is connected to the amplifier 220 of the compensation size regulator 200, and the "d'" terminal of the transformer T1 is grounded. The "a'" terminal is connected to the vertical output circuit (not shown), and the "b'" terminal is connected to the vertical deflection yoke V-DY.

The operation of the present invention as constructed above is as follows. The horizontal output pulse is transferred to the multivibrator M-V of the compensation position regulator 100 and regulated in an amount of its integration depending on the time constants of the variable resistance VR and the capacitor C0.

The output signal of the multivibrator M-V is divided by the resistances R1 and R2 and transferred into the base of the emitter follower transistor Q1 via the resistance R2. The resistance R4 connected to the emitter of the transistor Q1 is used as a load resistance to control the maximum value of the current transferred to the collector of the transistor Q2. The current can be controlled by regulating the variable resistance VR2 connected to the base of the transistor Q2. The output signal of the collector of the transistor Q2 is fed to the base of the transistor Q3, and the output signal of the collector of the transistor Q4 is transferred to the emitter of the transistor Q3.

The transistor Q5 connected to the emitter of the transistor Q4 stabilizes the emitter voltage of the transistor Q4. The output signal of the collector of the transistor Q5 is removed of noise by the peak coil L1, passing the diodes D2 and D1 and resistance R9 to stabilize the output voltage of the collector of the transistor Q3. The output signal of the transistor Q4 is incorporated with the capacitor C6 via the diode D4 and the coupling capacitor C5 to form an inverse parabolic waveform which is transferred to the primary coil (part c) of the modulation transformer. The resistance R12 receives the signal whose compensation size is regulated and determines the resonance value of the signal according to the on/off state of the switching device. The E-I transformer T1 modulates the vertical output signal having the vertical period varied and transfers it to the vertical deflection yoke.

FIGS. 9A–9D are waveform diagrams of the variable output signal of the compensation position regulator shown in FIG. 4. FIG. 9A is the waveform of a horizontal output pulse. The width of the horizontal output pulse can be preferably changed according to the time constants of the variable resistance VR and the capacitor C0, and FIGS. 9B, 9C, and 9D respectively show the first and second waveforms of the signal whose pulse width is varied according to the RC time constant.

When the horizontal output signal is modulated to the vertical output signal by changing the horizontal period, the position of the image can be moved on a screen, as shown in FIG. 10. With the waveform of a left-sided pulse shown in (c), the image is displayed leaning towards the left side at the top or bottom of the screen. (d) is the reverse of (c).

The waveform of the horizontal output signal is changed according to the amplification rates of the transistors Q3, Q4 and Q5, as illustrated in FIGS. 11A–11D. FIG. 11A is the waveform of a horizontal output pulse and FIG. 11B is that of a preferred output of the compensation position regulator 100. FIGS. 11C and 11D show first and second waveforms of the signal whose pulse width is varied according to the amplification rate of the amplifier 220.

FIG. 12 is an exemplary view of an image displayed on the screen when the horizontal output signal modulates the vertical output signal by the changing amplification rate of the amplifier 220. With the waveform of FIG. 11C, the image is displayed leaning towards the center of the screen. When the amplification rate is so small as to show the waveform of FIG. 11D, the image is displayed towards the edge of the screen.

As described above, the pulse width of a horizontal output signal is changed by the multivibrator so as to adjust the signal's compensation position. Then, the voltage of the signal is amplified to adjust the compensation size. The E-I transformer modulates the compensated vertical output signal variable by the input frequencies with the horizontal output signal and transfers it to the vertical deflection coil. Thus the present invention can compensate for the vertical distortion of an image by frequency modes.

It will be apparent to those skilled in the art that various modifications and variations can be made in the circuit for compensating for a vertical distortion of images by modes in a display in accordance with the present invention without departing from the spirit or scope of the invention. Thus, it is intended that the present invention cover the modifications and variations of this invention provided they come within the scope of the appended claims and their equivalents.

What is claimed is:

1. A circuit for compensating for a vertical distortion of images by modes, comprising:

a compensation position regulator for regulating a pulse width of a horizontal output signal by varying an integration value of an output pulse width of a horizontal output circuit, for adjusting an output position of the horizontal output signal;

a compensation size regulator for selectively amplifying the horizontal output signal voltage whose output position has been regulated by the compensation position regulator, for adjusting the voltage amplitude of the horizontal output signal; and a modulation circuit comprising a primary circuit for receiving the horizontal output signal whose output position and amplitude have been regulated by the compensation position regulator and the compensation size regulator, and a secondary circuit having first and second terminals for receiving a vertical output signal having a period variable by modes through said first terminal thereof, the modulation circuit modulating the vertical output signal variable by modes with the horizontal output signal and outputting the modulated vertical output signal to a vertical deflection coil connected to said second terminal of said secondary circuit.

2. The circuit as defined in claim 1, the compensation position regulator comprising a multivibrator and a variable resistance and a capacitance, the integration value of the horizontal signal being varied in accordance with a time constant of said variable resistance and said capacitance.

3. The circuit as defined in claim 1, the compensation size regulator comprising:

a buffering means for regulating the output gain of the compensation position regulator; and a means for amplifying an input signal whose gain has been regulated.

4. The circuit as defined in claim 1, the modulation circuit comprising:

an E-I transformer having a primary coil comprising said primary circuit for receiving the horizontal output signal, a secondary coil comprising said secondary circuit for receiving the vertical output signal whose period is variable by modes through said first terminal, the E-I transformer modulating the vertical output signal with the horizontal output signal and feeding the modulated vertical output signal to the vertical deflection coil connected to said second terminal.

5. The circuit as defined in claim 4, the secondary coil of the E-I transformer being coupled to a plurality of switching means for varying the period of the vertical output signal.

6. The circuit as defined in claim 5, the switching means comprising a plurality of field effect transistors.

7. The circuit as defined in claim 2, the compensation size regulator comprising:

a buffering means for regulating the output gain of the compensation position regulator; and a means for amplifying an input signal whose gain has been regulated.

8. The circuit as defined in claim 2, the modulation circuit comprising:

an E-I transformer having a primary coil comprising said primary circuit for receiving the horizontal output signal a secondary coil comprising said secondary circuit for receiving the vertical output signal whose period is variable by modes through said first terminal, the E-I transformer modulating the vertical output signal with the horizontal output signal and feeding the modulated vertical output signal to the vertical deflection coil connected to said second terminal.

9. The circuit as defined in claim 3, the modulation circuit comprising:

an E-I transformer having a primary coil comprising said primary circuit for receiving the horizontal output signal, a secondary coil comprising said secondary circuit for receiving the vertical output signal whose period is variable by modes through said first terminal, the E-I transformer modulating the vertical output signal with the horizontal output signal and feeding the modulated vertical output signal to the vertical deflection coil connected to said second terminal.

10. The circuit as defined in claim 7, the modulation circuit comprising:

an E-I transformer having a primary coil comprising said primary circuit for receiving the horizontal output signal, a secondary coil comprising said secondary circuit for receiving the vertical output signal whose period is variable by modes through said first terminal, the E-I transformer modulating the vertical output signal with the horizontal output signal and feeding the modulated vertical output signal to the vertical deflection coil connected to said second terminal.

11. The circuit as defined in claim 8, the secondary coil of the E-I transformer being coupled to a plurality of switching means for varying the period of the vertical output signal.

12. The circuit as defined in claim 9, the secondary coil of the E-I transformer being coupled to a plurality of switching means for varying the period of the vertical output signal.

13. The circuit as defined in claim 10, the secondary coil of the E-I transformer being coupled to a plurality of switching means for varying the period of the vertical output signal.

14. The circuit as defined in claim 11, the switching means comprising a plurality of field effect transistors.

15. The circuit as defined in claim 12, the switching means comprising a plurality of field effect transistors.

16. The circuit as defined in claim 13, the switching means comprising a plurality of field effect transistors.

* * * * *